United States Patent [19]
Hsu

[11] Patent Number: 5,408,557
[45] Date of Patent: Apr. 18, 1995

[54] FC-TYPE OPTICAL FIBER CABLE CONNECTOR'S ADAPTOR

[76] Inventor: Chung-tang Hsu, No. 34, Wu-Chun 8 Rd, Wu-Ku Ind. Park, Hsin Chuang City, Taipei Hsien, Taiwan, Prov. of China, 242

[21] Appl. No.: 230,484

[22] Filed: Apr. 20, 1994

[51] Int. Cl.⁶ .............................................. G02B 6/38
[52] U.S. Cl. .................................... 385/72; 385/55; 385/60; 385/70
[58] Field of Search .................. 385/55, 56, 60, 70, 385/72, 76–78

[56] References Cited

U.S. PATENT DOCUMENTS

| | | | |
|---|---|---|---|
| 5,067,783 | 11/1991 | Lampert | 385/60 |
| 5,082,345 | 1/1992 | Cammons et al. | 385/60 |
| 5,274,729 | 12/1993 | King et al. | 385/55 X |

*Primary Examiner*—John D. Lee
*Attorney, Agent, or Firm*—Lowe, Price, LeBlanc & Becker

[57] ABSTRACT

A FC-type optical fiber cable connector's adaptor, which includes a front casing, which has an externally threaded tubular outer coupling flange and a tubular inner coupling flange concentrically disposed around a center hole thereof for coupling the ferrule of a first optical fiber cable connector, and a back hole in line with the circular center hole thereof, a rear casing, which has an externally threaded tubular outer coupling flange and a tubular inner coupling flange concentrically disposed around a center hole thereof for coupling the ferrule of a second optical fiber cable connector, and a front stub mounting tube fitted into the back hole on the front casing, and a split sleeve inserted into the circular center holes on the front and rear casings and having two opposite ends respectively stopped against an inside annular flange within the circular center hole on either casing.

2 Claims, 2 Drawing Sheets

FC-TYPE OPTICAL FIBER CABLE CONNECTOR'S ADAPTOR

BACKGROUND OF THE INVENTION

The present invention relates to optical fiber cable connectors, and more particularly relates to a FC-type optical fiber cable connector's adaptor which is easy to assemble and practical in use.

Optical fiber cables have become more and more popular for use in telecommunications for the advantages of high transmission speed and low transmission loss. For connecting optical fiber cables together, adaptors connectors must be used so that the cables can be connected in straight alignment for signal transmission. Conventional FC-type adaptors are commonly comprised of two symmetrical casings fastened together by screws for coupling a respective male type optical fiber connector ferrule, a split sleeve connected between the casings, and a series of rings mounted around the split sleeve to keep in alignment. This structure of FC-type adaptor consists of a lot of parts. Therefore, the manufacturing and assembly process of this structure of FC-type adaptor is complicated, and its cost cannot be reasonably reduced.

SUMMARY OF THE INVENTION

The present invention has been accomplished to provide a FC-type adaptor which eliminates the aforesaid drawbacks. It is therefore one object of the present invention to provide a FC-type adaptor which is simple in structure and easy to assemble. It is another object of the present invention to provide a FC-type adaptor which is inexpensive to manufacture. It is still another object of the present invention to provide a FC-type adaptor which provides high precision. According to the preferred embodiment of the present invention, the FC-type adaptor comprises a front casing, a rear casing fastened to the front casing by screws, and a split sleeve received within the front and rear casings. The front casing has an externally threaded tubular outer coupling flange and an tubular inner coupling flange concentrically disposed around a center hole thereof for coupling the ceramic ferrule of a first optical fiber cable connector, and a back hole in line with the circular center hole thereof. The rear casing has an externally threaded tubular outer coupling flange and an tubular inner coupling flange concentrically disposed around a center hole thereof for coupling the ceramid ferrule of a second optical fiber cable connector, and a front stub mounting tube fitted into the back hole on the front casing. The split sleeve is inserted into the circular center holes on the front and rear casings, having two opposite ends respectively stopped against an inside annular flange within the circular center hole on either casing.

DETAILED DESCRIPTION OF THE PREFERRED EMBODIMENT

Figure 1:
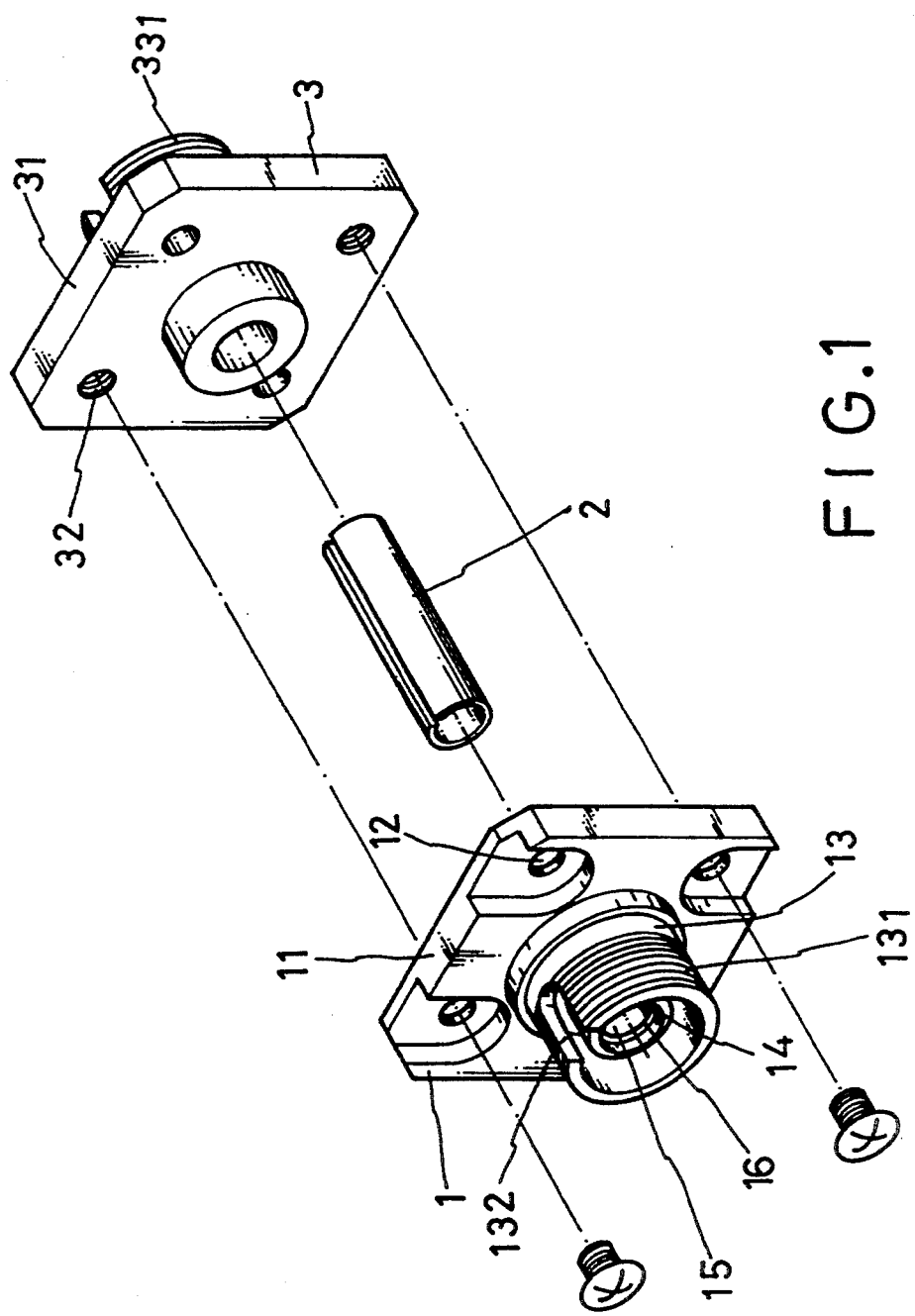
FIG. 1 is an exploded view of a FC-type adaptor according to the present invention.
Figure 2:
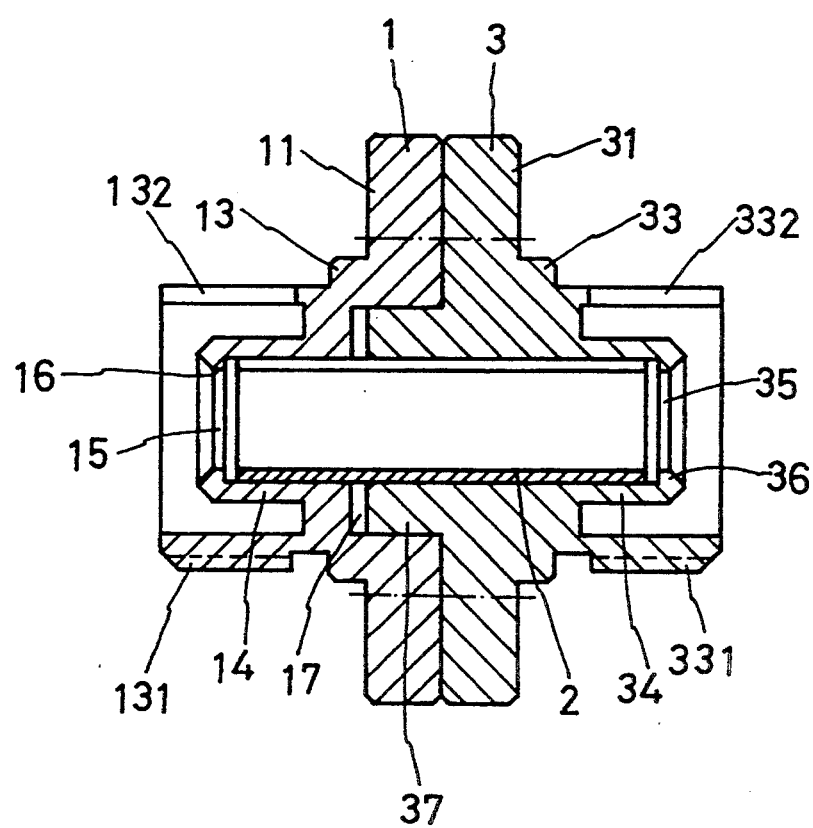
FIG. 2 is an assembly view in section of the FC-type adaptor shown in FIG. 1.

Referring to FIGS. 1 and 2, a FC-type adaptor in accordance with the present invention is generally comprised of a front casing 1, a split sleeve 2, and a rear casing 3.

The front casing 1 comprises a rectangular base wall 11 having four mounting holes 12 respectively disposed in the four corners thereof, a tubular outer coupling flange 13 raised from one side (namely, the front side) of the base wall 11 at the center, an outer thread 131 made around the outside wall of the tubular outer coupling flange 13, an elongated retaining slot 32 longitudinally disposed on the tubular outer coupling flange 13, a tubular inner coupling flange 14 raised from the base wall 11 and concentrically disposed within the tubular outer coupling flange 13 and defining a circular center hole 15, and an annular inside flange 16 made on the tubular inner coupling flange 14 around the circular center hole 15, and a back hole 17 disposed on an opposite side (namely, the back side) of the base wall 11 at the center and aligned with the circular center hole 15.

The rear casing 3 comprises a base wall 31 having four mounting holes 32 in the four corners thereof respectively connected to the mounting holes 12 on the base wall 11 of the front casing 1 by screws, a tubular outer coupling flange 33 raised from one side (namely, the back side) of the base wall 31 at the center, an outer thread 331 made around the outside wall of the tubular outer coupling flange 33, an elongated retaining slot 332 longitudinally disposed on the tubular outer coupling flange 33, a tubular inner coupling flange 34 raised from the base wall 31 and concentrically disposed within the tubular outer coupling flange 33 and defining a circular center hole 35 through the base wall 31, and an annular inside flange 36 made on the tubular inner coupling flange 34 around the circular center hole 35, and a front stub mounting tube 37 raised from an opposite side (namely, the back side) of the base wall 31 around the circular center hole 35.

The front and rear casings 1;3 may be respectively made through die casting to achieve high precision. The split sleeve 2 may be made of phosphor bronze or ceramic. The inner diameter of the split sleeve 2 is made according to the outer diameter of the ceramic plug tube of the optical fiber cable connector ferrule to be matched. The outer diameter of the split sleeve 2 fits into the circular center hole 15.

Referring to FIG. 2 again, the split sleeve 2 is inserted into the circular center hole 35 on the rear casing 3 and stopped at the annular inside flange 36 on the rear casing 3, then the front stub mounting tube 37 of the rear casing 3 is fitted into the back hole 17 on the front casing 1 permitting the split sleeve 2 to be inserted into the circular center hole 15 and stopped against the annular inside flange 16 on the front casing 1, and then the mounting holes 12;32 of the front and rear casings 1;3 are respectively fastened together by screws.

As indicated, the present invention provides a FC-type adaptor which is easy to assemble and inexpensive to manufacture, and which provides high precision.

While only one embodiment of the present invention has been shown and described, it will be understood that various modifications and changes could be made without departing from the spirit and scope of the invention.

What is claimed is:

1. A FC-type optical fiber cable connector's adaptor of the type comprising a front casing having an externally threaded tubular outer coupling flange raised from a rectangular base wall thereof at an outer side around a center through hole on the rectangular base wall of said front casing for coupling optical fiber cable connector ferrules, a rear casing fastened to said front casing by screws and having an externally threaded tubular outer coupling flange raised from a rectangular base wall thereof at an outer side around a center through hole on the rectangular base wall of said rear casing for coupling optical fiber cable connector ferrules, and a circular split sleeve inserted into the center hole on said front casing and the center hole on said rear casing, wherein said front casing further comprises a tubular inner coupling flange raised from the base wall thereof and concentrically disposed within the tubular outer coupling flange thereof around the center hole thereof, an annular inside flange raised from the tubular inner coupling flange thereof on the inside around the center hole of said front casing and stopped against said split sleeve at one end, and a back hole on the base wall thereof at an opposite side in line with the center hole of said front casing; said rear casing further comprises a tubular inner coupling flange raised from the base wall thereof and concentrically disposed within the tubular outer coupling flange thereof around the center hole thereof, an annular inside flange raised from the tubular inner coupling flange thereof on the inside around the center hole of said rear casing and stopped against said split sleeve at an opposite end, and a front stub mounting tube raised from the base wall thereof and fitted into the back hole on the base wall of said front casing.

2. The FC-type optical fiber cable connector's adaptor of claim 1 wherein said front and rear casings are respectively integrally shape formed by die casting.

* * * * *